(12) United States Patent
Hongo

(10) Patent No.: US 12,519,378 B2
(45) Date of Patent: Jan. 6, 2026

(54) METHOD FOR MANUFACTURING COIL

(71) Applicant: ASTER CO., LTD., Yokote (JP)

(72) Inventor: Takenobu Hongo, Fukushima (JP)

(73) Assignee: ASTER CO., LTD., Yokote (JP)

( * ) Notice: Subject to any disclaimer, the term of this patent is extended or adjusted under 35 U.S.C. 154(b) by 551 days.

(21) Appl. No.: 17/909,293

(22) PCT Filed: Jan. 8, 2021

(86) PCT No.: PCT/JP2021/000533
§ 371 (c)(1),
(2) Date: Sep. 2, 2022

(87) PCT Pub. No.: WO2021/176843
PCT Pub. Date: Sep. 10, 2021

(65) Prior Publication Data
US 2023/0093398 A1    Mar. 23, 2023

(30) Foreign Application Priority Data

Mar. 3, 2020 (JP) ................................. 2020-035504

(51) Int. Cl.
*H02K 15/043* (2025.01)
(52) U.S. Cl.
CPC .................. *H02K 15/043* (2025.01)
(58) Field of Classification Search
CPC ............. H01F 27/2847; H01F 27/303; H02K 15/0414; H02K 15/043; H02K 3/04
See application file for complete search history.

(56) References Cited

U.S. PATENT DOCUMENTS

| 6,462,453 B1 | 10/2002 | Asao |
| 7,126,451 B2 | 10/2006 | Maruyama |

(Continued)

FOREIGN PATENT DOCUMENTS

| CN | 105829010 A | 8/2016 |
| DE | 102013012659 A1 | 2/2015 |

(Continued)

OTHER PUBLICATIONS

Hearing Notice dated Feb. 8, 2024, directed to IN Application No. 202247056033; 2 pages.

(Continued)

*Primary Examiner* — Minh N Trinh
(74) *Attorney, Agent, or Firm* — Morrison & Foerster LLP

(57) ABSTRACT

Provided is a method for manufacturing a coil enabling mass-production of good-quality coils that have an enhanced space factor in a core and enhanced heat dissipation performance and that are free from deterioration in properties due to cutting and welding. A method for manufacturing a coil includes: a step of preparing a plurality of strip-shaped flat conductors which can constitute a helical structure body when the flat conductors are continuously joined; a welding step of forming the helical structure body by butting and pressing one end face of one of the flat conductors in a strip longitudinal direction and one end face of another one of the flat conductors in the strip longitudinal direction; an annealing step of the helical structure body; an insulation step of the helical structure body; and a molding step of forming the helical structure body into a desired shape.

6 Claims, 11 Drawing Sheets

(56) References Cited

U.S. PATENT DOCUMENTS

| | | |
|---|---|---|
| 7,235,146 B2 | 6/2007 | Ebi |
| 10,211,710 B2 | 2/2019 | Hongo |
| 10,422,840 B2 | 9/2019 | Schön |
| 10,742,097 B2 | 8/2020 | Hongo |
| 11,404,944 B2 | 8/2022 | Lee et al. |
| 2005/0046538 A1 | 3/2005 | Maruyama |
| 2005/0241131 A1 | 11/2005 | Ebi |
| 2016/0315525 A1 | 10/2016 | Hongo |
| 2019/0006921 A1 | 1/2019 | Hongo |
| 2020/0099279 A1 | 3/2020 | Lee et al. |
| 2020/0287446 A1 | 9/2020 | Hongo |
| 2021/0036566 A1 | 2/2021 | Hongo et al. |
| 2021/0272752 A1 | 9/2021 | Hongo |
| 2022/0337135 A1 | 10/2022 | Hongo |
| 2022/0352792 A1 | 11/2022 | Hongo |
| 2023/0093398 A1* | 3/2023 | Hongo .................. H01F 27/303 29/596 |

FOREIGN PATENT DOCUMENTS

| | | | |
|---|---|---|---|
| JP | 2008-228434 A | 9/2008 | |
| JP | 2009-254001 A | 10/2009 | |
| JP | 5592554 B1 | 9/2014 | |
| JP | 5635674 B1 | 12/2014 | |
| JP | 2015-116590 A | 6/2015 | |
| JP | 2015116607 A | 6/2015 | |
| JP | 2018051630 A | 4/2018 | |
| JP | 2019-140759 A | 8/2019 | |
| JP | 2019169993 A | 10/2019 | |
| JP | 2020-14298 A | 1/2020 | |
| KR | 10-1849636 B1 | 5/2018 | |
| WO | 2020/017394 A1 | 1/2020 | |

OTHER PUBLICATIONS

Supplementary European Search Report dated Jul. 14, 2023, directed to EP Application No. 21763762.8; 4 pages.

Office Action dated Dec. 9, 2022, directed to IN Application No. 202247056033; 5 pages.

Notice of Reasons for Refusal dated Oct. 10, 2023, directed to JP Application No. 2020-035504; 7 pages.

International Search Report and Written Opinion mailed Mar. 2, 2021, directed to International Application No. PCT/JP2021/000533; 12 pages.

First Office Action dated Sep. 15, 2025, directed to CN Application No. 202180017758.4; 15 pages.

* cited by examiner

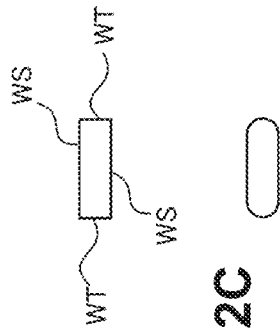
FIG. 2B
FIG. 2C
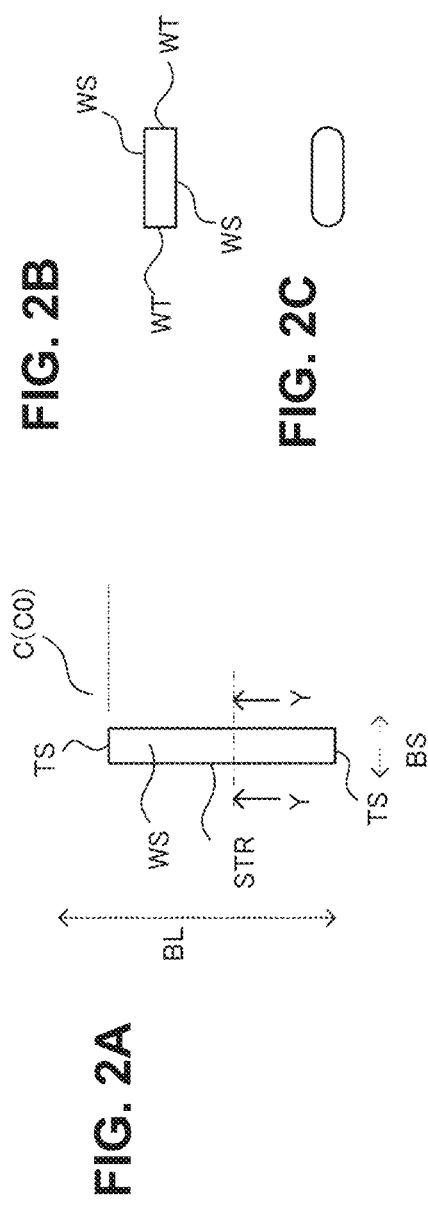
FIG. 2A
FIG. 2D
FIG. 2E
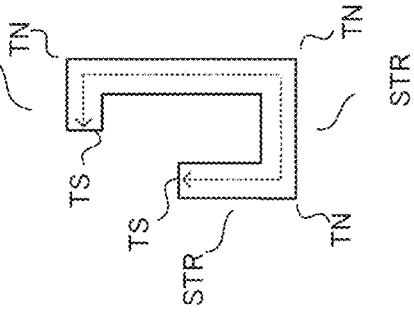
FIG. 2F
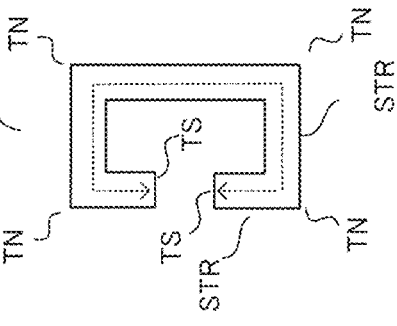
FIG. 2G

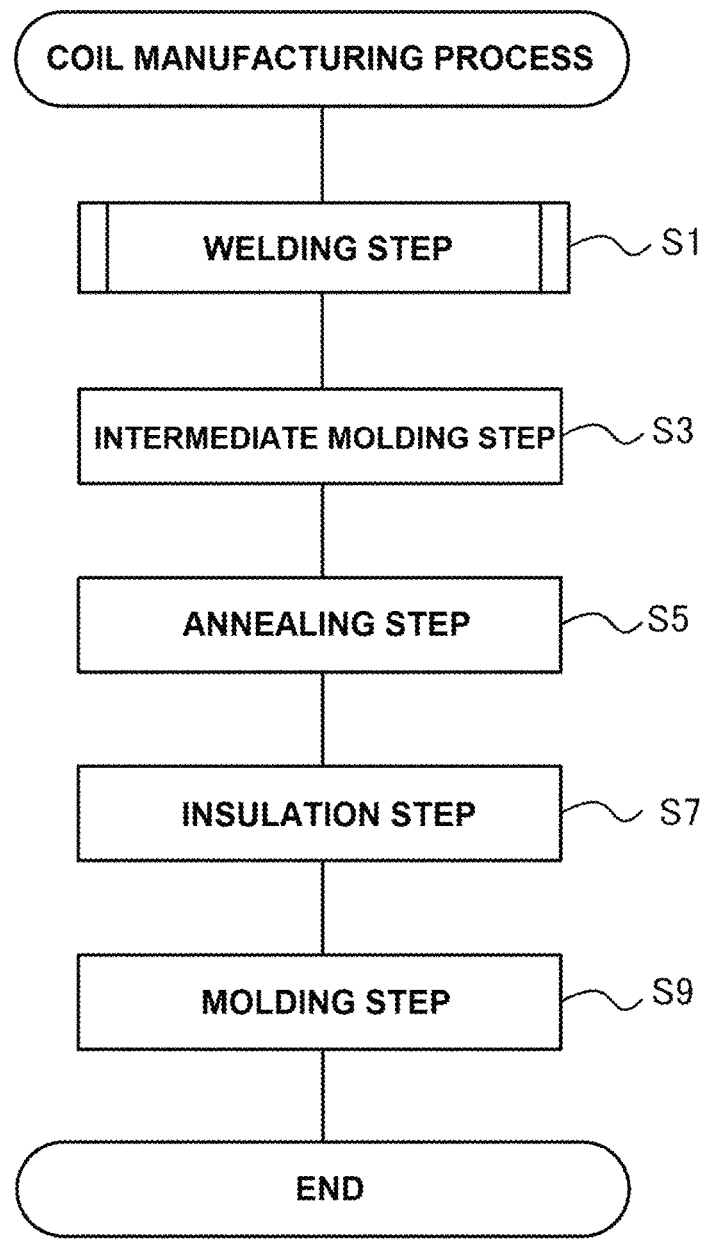

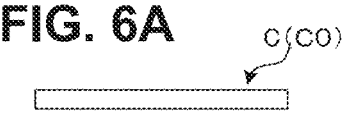
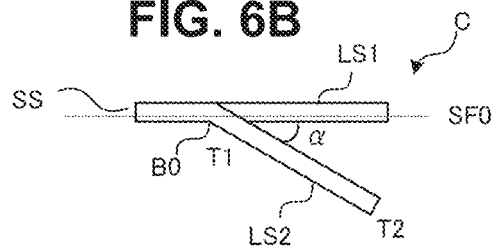
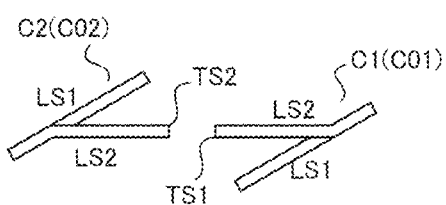
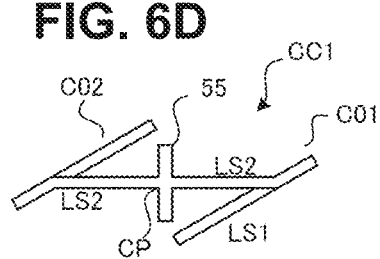
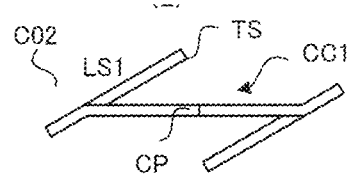
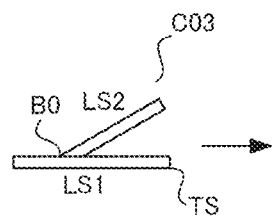
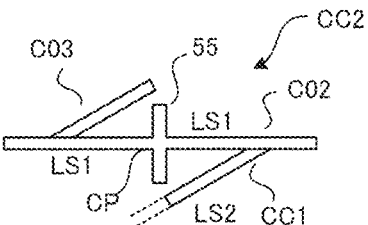
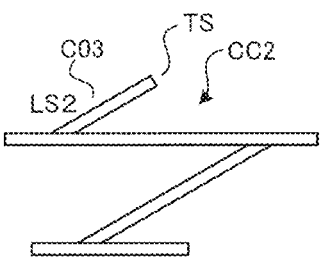
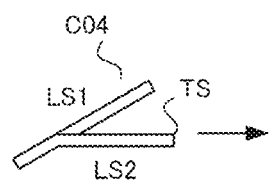
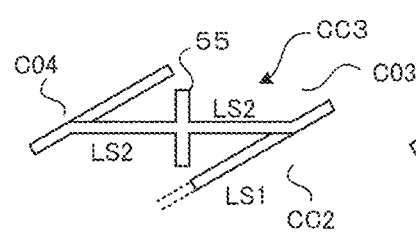
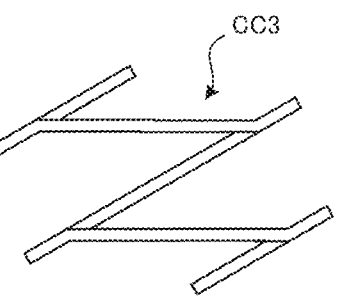

METHOD FOR MANUFACTURING COIL

CROSS-REFERENCE TO RELATED APPLICATIONS

This application is a U.S. national stage application under 35 U.S.C. § 371 of International Application No. PCT/JP2021/000533, filed Jan. 8, 2021, which claims the priority of Japanese Application No. 2020-035504, filed Mar. 3, 2020, the entire contents of each priority application of which is incorporated herein by reference.

FIELD OF THE DISCLOSURE

The present invention relates to a method for manufacturing a coil in which flat plates are welded through pressurization and deformation.

BACKGROUND OF THE DISCLOSURE

A stator, which is a component member of a motor, has a coil provided around a core (stator core). To achieve a low loss and smaller motor, it is important to enhance the space factor of the coil in the core.

A coil with an enhanced space factor in the core and a manufacturing apparatus thereof have been known (see, for example, Patent Literature 1). The coil is formed by preparing flat conductors punched into a U shape (a shape of Japanese katakana "ko"), welding the end faces of the flat conductors to each other through cold pressure welding to form a region for one turn of the coil, and continuously joining the formed regions for one turn into a helical form.

According to the technique described in Patent Literature 1, it is possible to provide a good-quality coil which has an enhanced space factor in a core and enhanced heat dissipation performance and which is free from deterioration in properties in welded portions even though the coil has a helical structure formed by welding (joining) the flat conductors.

Patent Literature 1: Japanese Patent No. 5592554

SUMMARY OF THE DISCLOSURE

However, in the aforementioned coil manufacturing apparatus, it cannot be said that sufficient examination has been made about a technique for mass-production of good-quality coils. Therefore, there is room for improvement in terms of the enhancement of productivity.

It is an object of the present invention to provide a method for manufacturing a coil enabling mass-production of good-quality coils that have an enhanced space factor in a core and enhanced heat dissipation performance.

The present invention solves the above-described problem by a following means.

The present invention includes: a step of preparing a plurality of strip-shaped flat conductors which can constitute a helical structure body when the flat conductors are continuously joined; a welding step of forming the helical structure body by butting and pressing one end face of one of the flat conductors in a strip longitudinal direction and one end face of another one of the flat conductors in the strip longitudinal direction; an annealing step of the helical structure body; an insulation step of the helical structure body; and a molding step of forming the helical structure body into a desired shape.

The present invention can provide a method for manufacturing a coil enabling mass-production of good-quality coils that have an enhanced space factor in a core and enhanced heat dissipation performance.

BRIEF DESCRIPTION OF THE FIGURES

FIGS. 1A-1C include diagrams showing appearance of a coil manufactured by a method for manufacturing a coil according to an embodiment of the present invention, in which FIG. 1A is a plan view, and FIGS. 1B and 1C are side views thereof.

FIGS. 2A-2G include diagrams illustrating a coil piece according to the present embodiment, in which FIG. 2A is a plan view, FIGS. 2B and 2C are cross-sectional views, and FIGS. 2D-2G are plan views thereof.

FIG. 3 is a flowchart illustrating a process flow in the method for manufacturing a coil according to the present embodiment.

FIGS. 6A-6K include schematic side views of the coil pieces for illustrating a method for manufacturing a coil according to the present embodiment.

FIGS. 9A-9C include schematic views of the coil for illustrating the method for manufacturing a coil according to the present embodiment, in which FIG. 9A is a plan view, FIG. 9B is a cross-sectional view, and FIG. 9C is a side view.

FIGS. 11A-11E include schematic views of the coil for illustrating the modified examples of the method for manufacturing a coil according to the present embodiment, in which FIGS. 11A and 11B are cross-sectional views, and FIGS. 11C-11E are side views.

DETAILED DESCRIPTION OF THE DISCLOSURE

Hereinafter, embodiments of the present invention will be described in details with reference to the drawings.

Figure 1A:
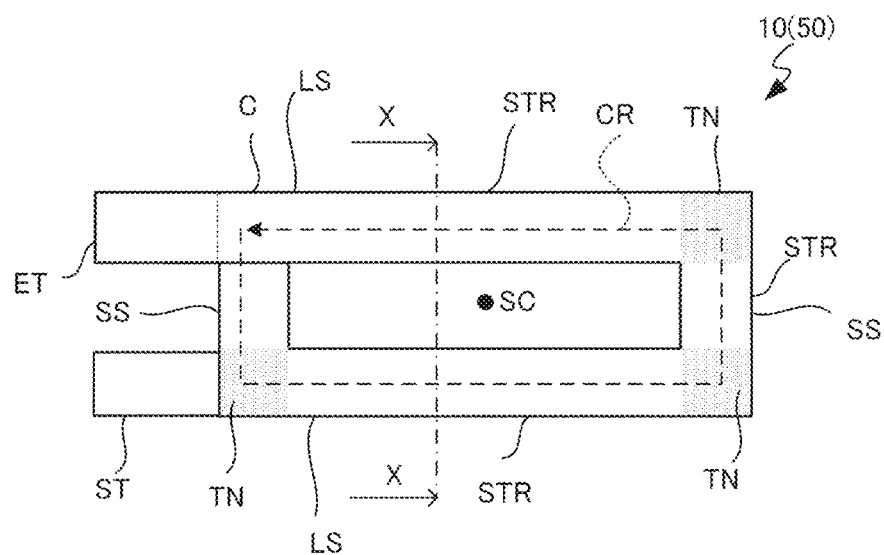
Figure 1B:
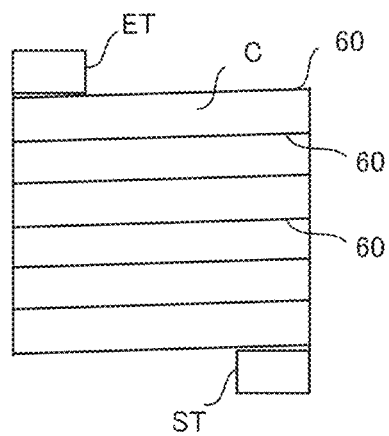
Figure 1C:
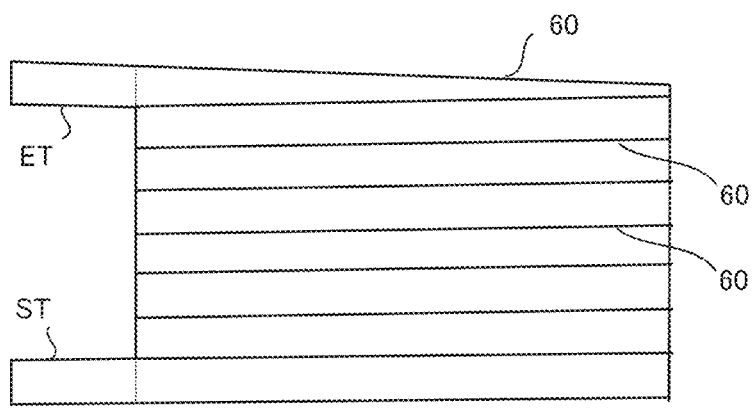

FIGS. 1A-1C include appearance views illustrating the outline of a coil 10 manufactured by a method for manufacturing a coil according to the present embodiment, in which FIG. 1A is a plan view of the coil 10 in a helical structure as viewed from a helical axis direction, FIG. 1B is a side view as viewed from the direction of a shorter side SS of the helical structure (for example, the left side in FIG. 1A, and FIG. 1C is a side view as viewed from the direction of a longer side LS of the helical structure (for example, a lower side in FIG. 1A).

In FIGS. 1A-1C and subsequent drawings, some of the configurations will be omitted as appropriate to simplify the drawings.

In FIGS. 1A-1C and subsequent drawings, the size, shape, thickness, etc. of members will be expressed in an exaggerated manner as appropriate.

As shown in FIGS. 1A-C, the coil 10 of the present embodiment has a helical structure formed with flat conductors (coil pieces C). In one example, the coil 10 is attached to a stator that constitutes a motor. More specifically, the coil 10 is a so-called concentrated winding coil that is wound so that each turn constituting the helical structure has an axial center SC that is substantially identical (a portion of each turn is substantially overlapped in a helical axis direction of the coil 10).

The coil 10 is also an edgewise coil formed by continuously connecting a plurality of strip-shaped flat conductors (coil pieces) C, each having a straight portion (straight portion STR), into a helical structure body 50 (configured as wound flat conductors C when completed).

As shown in FIG. 1A, a region for one turn of the helical structure body 50 (a region indicated by a large dashed arrow in FIG. 1A, which is hereinafter referred to as a region CR for one turn) has winding corner portions TN in a substantially right-angled shape. At least an inner peripheral side of the helical structure body 50 (both the inner peripheral side and the outer peripheral side in FIG. 1A) are (substantially) rectangular in a plan view as viewed from the axis direction of the helical structure body 50. The flat conductors C constituting the coil 10 are also referred to as coil pieces C in the following description.

Although not shown in detail, the coil 10 is configured so that an insulating resin 60 is applied to the periphery of the flat conductors C with a helical structure. The insulating resin 60 is continuously provided from one end ST side to the other end ET side of the coil 10 along a helical traveling direction. The regions CR for one turn of the helical structure body 50 are each insulated by the insulating resin 60. The one end ST and the other end ET of the coil 10 are connection portions (terminals) with other members, and may not be coated with the insulating resin 60.

With reference to FIGS. 2A-2G, the flat conductors C constituting the coil 10 will be described. FIGS. 2A-2G include diagrams showing examples of the flat conductor C that constitutes the coil 10 of the present embodiment. FIG. 2A is a plan view (top view) of the flat conductor C. FIGS. 2B and 2C are enlarged cross-sectional views of FIG. 2A taken along line Y-Y. FIGS. 2D-2G are plan views (top views) showing examples of the shape of the flat conductor C.

The coil 10 is a series of strip-shaped flat conductors C connected in their straight portions STR along a strip longitudinal direction BL (helical traveling direction indicated by a dashed arrow line). More specifically, end faces TS of the flat conductors C in the strip longitudinal direction BL (helical traveling direction) shown in FIG. 2A are butted and pressed (pressure-welded, such as cold pressure-welded) against each other so as to be continuously joined to form the helical structure body 50 which has a desired number of turns.

As shown in FIGS. 2A-2C, the flat conductors (coil pieces) C of the present embodiment are strip-shaped (tape-shaped) conductors long in a prescribed direction, with two wider surfaces WS that face each other and two narrow surfaces WT that face each other. The conductors C also have a cross section (cross section taken along line Y-Y in FIG. 2A) orthogonal to the strip longitudinal direction BL, which is formed into a rectangular shape as shown in FIG. 2B or a rectangular shape with rounded corners as shown in FIG. 2C. In the following description, the flat conductors C which have a (substantially) rectangular shape in a cross section that is orthogonal to the strip longitudinal direction BL as shown in FIG. 2B will be used as an example.

Specifically, the flat conductors (coil pieces) C in the present embodiment can constitute the helical structure body 50 when the plurality of flat conductors C are continuously joined. Moreover, the region CR for one turn of the helical structure body 50 in the present embodiment is constituted of one or more coil pieces C.

In other words, the coil pieces C have a shape constituted of only the straight portion STR (FIG. 2A) or a shape which has at least one straight portion STR and at least one corner portion TN (FIGS. 2D-2G). Here, the corner portion TN is a portion (direction change portion) bent to alter an extending direction of the strip longitudinal direction BL.

In the case of the flat conductors (coil pieces) C which have the corner portions TN as shown in FIGS. 2D-2G, the respective corner portions TN are bent in an identical direction (consistently in the right or left direction) along the strip longitudinal direction BL so as to make a helical form when the flat conductors are continuously joined. In the case of the coil pieces C which have the corner portions TN, it is desirable for at least one (preferably all) of the corner portions TN to have a shape that is not a curve (for example, a substantially right-angled) shape.

In the following description, the coil pieces C also include a helical structure body 50 that is formed by continuously joining (connecting) the plurality of coil pieces (flat conductors) C but is not yet completed as the coil 10 which has a prescribed number of turns (a helical structure body 50 with additional coil pieces C yet to be connected thereto). In other words, in the following description, the coil pieces C include, as shown in FIGS. 2A-2G, a minimum unit coil piece (unconnected coil piece) which has a linear shape or which has the corner portions TN that bends in the same direction in the strip longitudinal direction, a coil piece that is formed by connecting a plurality of minimum unit coil pieces C and that is shorter than the region CR for one turn of the coil 10 (the helical structure body 50), or a coil piece which has a helical structure longer than the region CR for one turn of the coil 10 (helical structure body 50). When it is necessary for these coil pieces to be distinguished for the convenience of description, the minimum unit coil piece is referred to as a unit coil piece C0 (C01, C02, C03 . . . C0N), a welded product of coil pieces C formed by connecting a plurality of unit coil pieces C0, that is, a welded product not yet completed as the coil 10 (the helical structure body 50 yet to be completed) is referred to as a welded coil piece CC (CC1, CC2, . . . CCN), and the helical structure body 50 scheduled to be completed (in the completed state) with a prescribed number of turns is referred to as a coil 10.

In an example, the coil pieces C (unit coil pieces C0) are configured, by a punching process of a copper plate (for example, plate-like oxygen-free copper with a thickness of, for example, 0.1 mm to 5 mm (high purity copper containing no oxides and with a purity of 99.95% or more)) or the like, to have a linear shape or a shape which has a substantially right-angled (non-curved) direction change portion (corner portion) TN. More specifically, in a plan view (top view), the shapes of the unit coil pieces C0 include a linear shape (I shape) without any corner portion TN (FIG. 2A), an L shape which has one corner portion TN (FIG. 2D), a U shape (a shape of Japanese katakana "ko") which has two corner portions TN (FIG. 2E), a substantially C shape which has three corner portions TN (FIG. 2F), and a C shape (FIG. 2G) or a substantially 0 shape which has four corner portions TN. In the following description, the coil pieces C may be described to have a U shape, a (substantially) C shape, and a substantially 0 shape. In any case, the corner portions TN are all in a substantially right-angled shape. The plurality of coil pieces C for manufacturing the coil 10 may be in any one of the shapes in FIGS. 2A-2G (the plurality of coil pieces C are all in the same shape), or may be in any combination of the plurality of shapes shown in FIGS. 2A-2G.

FIG. 3 is a flowchart showing an example of the flow of a process (coil manufacturing process) related to the method for manufacturing a coil according to the present embodiment.

The method for manufacturing a coil includes, for example, a welding step, an intermediate molding step, an annealing step, an insulation step, and a molding step. In one example, the flow of the process (coil manufacturing process) by the method for manufacturing a coil according to the present embodiment is performed in order of the welding step (step S1), the intermediate molding step (step S3), the annealing step (step S5), the insulation step (step S7), and the molding step (step S9) as shown in FIG. 3. Hereinafter, the steps will be described in sequence.

First, the welding step shown in step S1 in FIG. 3 will be described. In the welding step, the helical structure body 50 is formed by preparing a plurality of strip-shaped flat conductors (coil pieces) C, which can constitute the helical structure body 50 when continuously joined, and butting and pressing one end face TS of one of the flat conductors C in the strip longitudinal direction BL and one end face TS of another one of the flat conductors C in the strip longitudinal direction BL.

Figure 4A:
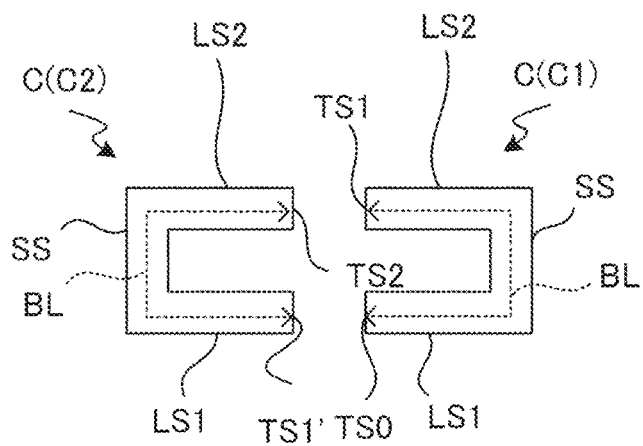
FIGS. 4A-4C include plan views illustrating the coil pieces according to the present embodiment.
Figure 4B:
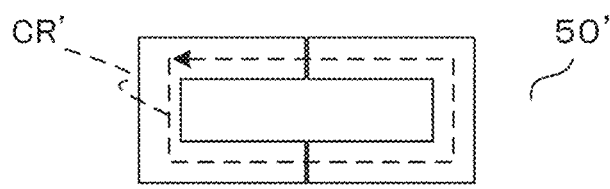
Figure 4C:
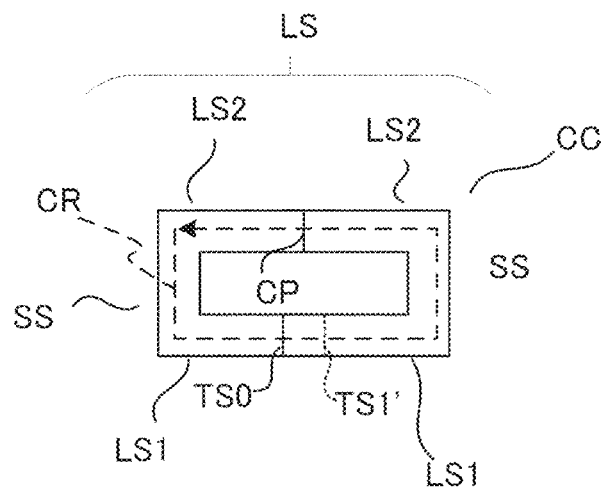

First, with reference to FIGS. 4A-4C, the coil pieces C to be prepared will be described. Here, as an example, the coil pieces C are in a U shape (in the shape of Japanese katakana "ko") as shown in FIG. 2E. FIGS. 4A and 4B are plan (top) views of two coil pieces C (C1, C2). FIG. 4C is a plan view showing a welded portion CP formed by pressure-welding one end faces TS of the respective coil pieces C in the welding step. Here, although the coil pieces C are represented by coil pieces C1 and C2 for the sake of convenience, they are coil pieces which have a (substantially) identical shape, and their front and back are reversed about end faces TS1 and TS2.

As shown in FIG. 4A, two coil pieces C (C1, C2) each have the end faces TS (TS0, TS1, TS1', TS2) in the strip longitudinal direction BL indicated by dashed arrows. As shown in FIG. 4B, the coil pieces C can form a helical structure body in a virtual state (hereinafter referred to as a "virtual helical structure body 50'") by abutting the end faces TS (the end face TS1 to the end face TS2, and the end face TS0 to the end face TS1') in the strip longitudinal direction BL. The virtual helical structure body 50' is set so that a length of a virtual region for one turn in the helical traveling direction indicated by a large dashed arrow line in FIG. 4B (hereinafter referred to as a "virtual region CR' for one turn") is longer, by a pressing amount for pressure welding, than a length of the region CR for one turn (indicated by the large dashed arrow line) of the welded coil piece CC (same as the coil 10 and the helical structure body 50) formed by welding two coil pieces C shown in FIG. 4C.

Specifically, with reference to FIG. 4A, the virtual region CR' for one turn (FIG. 4B) formed by abutting the end face TS1 of the coil piece C1 and the end face TS2 of the coil piece C2 are set to be longer, by the pressing amount for pressure welding, than the region CR for one turn (FIG. 4C) of the welded coil piece CC formed by pressure welding the end faces TS1 and TS2. Specifically, a preparation length that is a total distance obtained by totaling the distances of the respective coil pieces C in the strip longitudinal direction BL is set to be longer by a margin than a completion length of the coil 10 in a spiral longitudinal direction. The margin is set to a total reduction distance that is a distance reduced by pressing when all the coil pieces C are cold pressure-welded.

Figure 5:
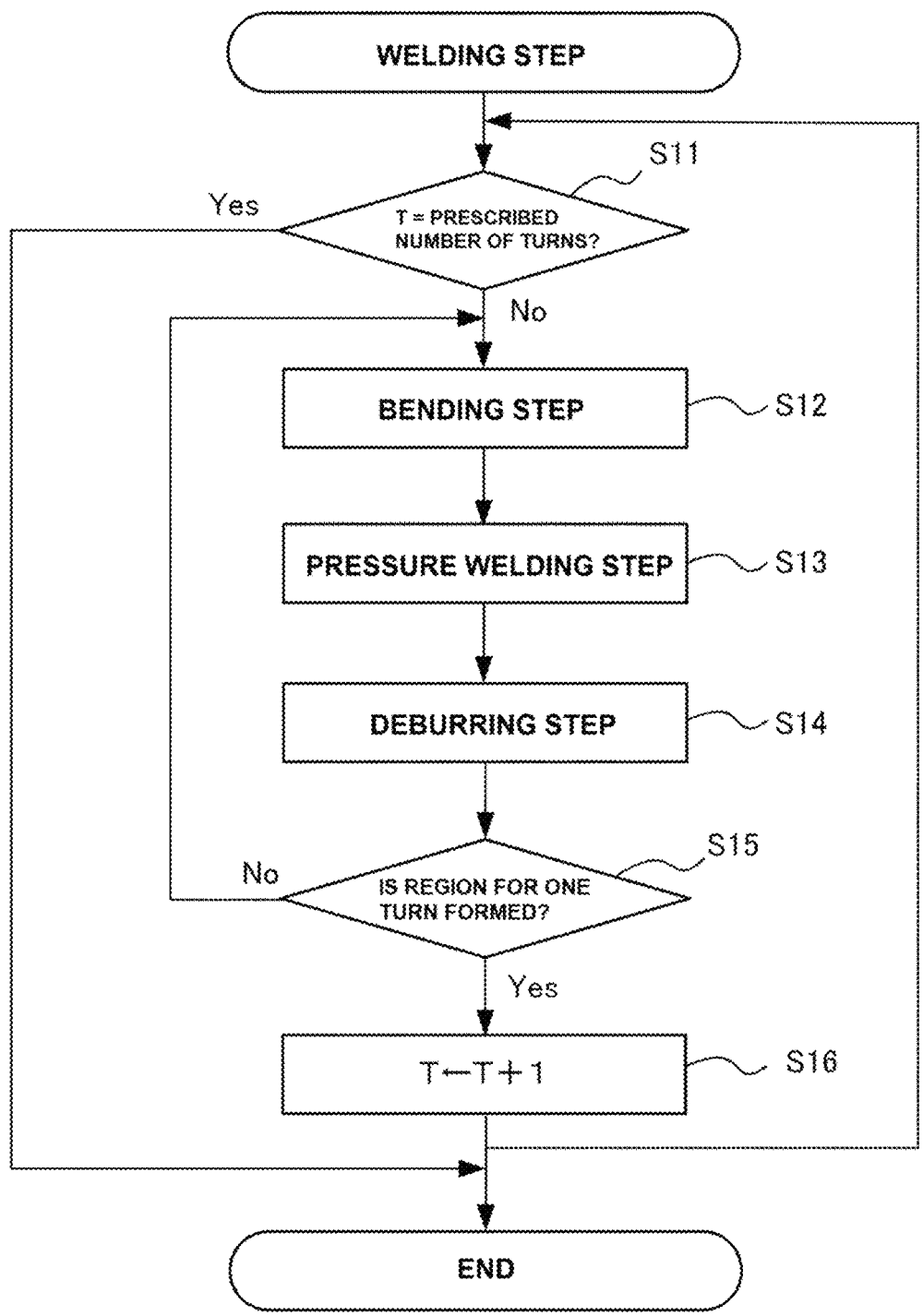
FIG. 5 is a flowchart showing a process flow of a welding step according to the present embodiment.

FIG. 5 is a flowchart showing an example of a process flow of the welding step shown in step S1 in FIG. 3. More specifically, the welding step includes, for example, a bending step (step S12), a pressure welding step (step S13), and a deburring step (step S14).

In the welding step, it is first determined whether the number of turns is a prescribed number of turns T (the number of turns T of the completed coil 10) (step S11). When the prescribed number of turns T is reached, the process is terminated. Otherwise, the bending step is performed (step S12). After the bending step, the pressure welding step is performed (step S13), followed by the deburring step (step S14). After the deburring step, it is determined whether or not the region CR for one turn is completed (step S15). When the region CR for one turn is not completed, the bending step of a next coil piece C is performed (step S12). When the region CR for one turn is completed, the number of turns T (step S16) is incremented, and the process returns to determination of the number of turns T (step S11). In the case of the first coil piece C, there is no other coil piece C to be pressure-welded to. Hence, the bending step (step S12) is followed by the bending step (step S12) of a next coil piece C, and then the coil pieces C are pressure-welded in the pressure welding step (step S13).

Here, whether or not the region CR for one turn is completed (step S15) is determined, for example, on the basis of the number of coil pieces C to be processed. For example, in the case where the coil pieces C of the identical shape are welded to form the helical structure body 50 as shown in FIGS. 4A-4C, the number of coil pieces C that constitute the region CR for one turn is identified (in this example, the region CR for one turn is completed by two coil pieces C). Therefore, monitoring the number of coil pieces C makes it possible to determine the region CR for one turn. In addition to the above case, the region CR for one turn may also be determined on the basis of, for example, appearance (or weight, etc.) of the coil pieces C (welded coil piece CC) after the pressure welding step, by the acquisition of images, etc.

Hereinafter, major steps are further described also with reference to FIGS. 6A-6K. FIGS. 6A-6K include side views of coil pieces C (welded coil piece CC) (as viewed from the left or right side in FIG. 2E.

In the bending step (step S12 in FIG. 5), a bent portion B0 is formed for each of the coil pieces C by bending the coil pieces C so that a portion along a helical traveling direction inclines with respect to the remaining portion. The bending step is performed before the pressure welding of the coil pieces C. FIG. 6A is a side view of the coil piece C before deformation. FIG. 6B is the coil piece C after the bent portion B0 is formed.

As shown in FIG. 6A, the coil piece C before deformation is a plate-shaped coil piece C punched from a plate as it is. The entire region of the coil piece C is present in a substantially identical plane without being intentionally deformed. Here, the coil pieces C (C1, C2), which constitute the region CR for one turn corresponding to the first turn of the helical structure body 50, are unit coil pieces C0 (C01, C02).

In the bending step, each of the coil pieces C (C1, C2) is bent (subjected to bending processing), before welding (pressure welding), so that one side (for example, a longer side region LS2) of the two facing sides (for example, longer side regions LS1 and LS2 constituting a longer side LS as shown in FIGS. 4A and 4C) scheduled to constitute a region CR for one turn of the helical structure body 50, is inclined with respect to the other side (for example, the longer side region LS1). Thus, the bent portion B0 is formed as shown in FIG. 6B. In this example, the coil pieces C1 and C2 are identical in shape, and so the formation aspects of the bent portions B0 (position, bending angle α, etc.) are also identical.

More specifically, in the case where, for example, one longer side region LS1 and a shorter side SS of a coil piece C are positioned in a substantially identical plane (hereinafter referred to as reference plane SF0), and the reference plane SF0 is maintained horizontally, the other longer side region LS2 is bent so as to be inclined with respect to the reference plane SF0 with the bent portion B0 as a boundary. The coil piece C is bent at the position of the bent portion B0 so that the other longer side region LS2 is positioned in such a manner that other end portion T2 (that is on the side departing away from the shorter side SS), rather than an end portion T1 closer to the shorter side SS, is below (or above) the reference plane SF0, i.e., the reference plane SF0 (one longer side region LS1) and the other longer side region LS2 form an angle α.

Thus, in the bending step in the present embodiment, the coil pieces C1 and C2 which are scheduled to constitute a region CR for one turn of the coil 10 are bent so that one side, out of two facing sides on the longer side of the coil pieces C1 and C2 (longer side regions LS1, LS2) is inclined with respect to the other side.

One longer side region LS1 and the other longer side region LS2 in the above example are different in name only for the convenience of description. In other words, the longer side regions LS1 and LS2 can be exchanged. In that case, the bent portion B0 may be deformed so that one longer side region LS1 and the other longer side region LS2 form a generally prescribed angle α.

In the pressure welding step (step S13 in FIG. 5), as shown in FIG. 6C, one end face TS1 of the bent coil piece C1 (unit coil piece C01) and one end face TS2 of the bent coil piece C2 (unit coil piece C02) are pressed along the strip longitudinal direction BL, and connected (cold-pressure welded) to form a welded coil piece CC1 (FIG. 6D). FIG. 4C is a plan view (top view) of the welded coil piece CC1 corresponding to a region CR for one turn welded in this manner. The coil 10 is formed by continuously joining a predetermined number of the regions CR for one turn. Accordingly, in FIG. 4C, the other end face TS0 is not welded to the other end face TS1', and therefore the region CR for one turn in this state is discontinuous in, for example, an opposite position of the welded portion CP.

In the pressure welding step, the end faces TS1 and TS2 are joined and pressed in the straight portions of the unit coil piece C01 and the unit coil piece C02, while the distance in the strip longitudinal direction BL is reduced (see FIGS. 4B and 4C). As described before, the virtual helical structure body 50', formed of the plurality of coil pieces C (unit coil pieces C0), is set so that the virtual region CR' for one turn is longer, by the pressure amount for welding, than the region CR for one turn. In the pressure welding step, the coil pieces C are pressed against each other so that the length of the virtual region CR' for one turn is identical to the length of the region CR for one turn of the helical structure body 50.

In this example, in the longer side region LS2 of the unit coil piece C01 (coil piece C1) and the longer side region LS2 of the unit coil piece C02 (coil piece C2), the end faces TS1 and TS2 are pressed against each other. However, depending on the shape of the coil pieces C, the end faces TS may be pressed against each other on the shorter side SS.

Here, regarding formation of one welded portion CP, it is possible to perform cold pressure welding of the coil pieces C by one pressing session, or to perform cold pressure welding by repeating pressing sessions a number of times. Repeating pressing sessions can stabilize a welded surface. For example, regarding the cold pressure welding of one welded portion CP, the pressing time in one pressing session is shortened (for example, 5 seconds or less), the number of pressing sessions is increased (for example, about three to ten), and an interval of pressing (interval between an Nth pressing session and an N+1 st pressing session) is also shortened to the extent that the welded region is not oxidized.

More specifically, in the pressure welding step, a pressing-in amount (compression amount) in one pressing session is about 0.5 mm for each of the coil piece C1 and the coil piece C2. For example, the pressing session of about 5 seconds or less is repeated three to ten times for one welded portion CP so as to compress the welded portion CP by about 1 mm or more (preferably 1.5 mm or more, and specifically about 2 mm). With the operation, the stable welded surface is obtained.

As shown in FIG. 6D, after cold pressure welding of two coil pieces C1 and C2 (after the welded coil piece CC1 is formed), burrs 55 are generated in the welded portion CP due to extrusion. With the burrs 55 remaining, they may interfere with a pressure welding device or the like during the next pressure welding. In the deburring step (step S14 in FIG. 5), the burrs 55 are removed.

The burrs 55 are generated in a vertical up-down direction so as to be substantially orthogonal to a wider surface WS of the welded coil piece CC1 in the welded portion CP. The burrs 55 are removed by, for example, cutting with a cutting unit, such as scissors, or by scraping (grinding, polishing) with saw blades, blasting, etc. After removal of the burrs 55, a surface finish process such as polishing may also be performed. In addition, the burrs 55 may be removed by partial dissolution. The burrs 55, generated in the vertical up-down direction so as to be substantially orthogonal to the wider surface WS of the welded coil piece CC1, may all be removed by one deburring step, or, for example, the burrs 55 on the upper side and the burrs 55 on the lower side may be removed separately multiple times. In this way, a welded coil piece CC1 with the burrs 55 removed is obtained (FIG. 6E).

In the present embodiment, whenever one welded portion CP is formed, the burrs 55 are removed. The welded coil piece CC1 after removal of the burrs 55 (FIG. 6E) is pressure-welded to a new coil piece C (a coil piece C03 to be newly joined). Specifically, the bending step (step S12 in FIG. 5) is performed for the new unit coil piece C03 to form a bent portion B0 (FIG. 6F). Then, as shown in FIG. 6G, the new unit coil piece C03 and the welded coil piece CC1 with the burrs 55 removed are pressure-welded to form a new welded coil piece CC2. In this example, the end face TS of the longer side region LS1 of the unit coil piece C03 is pressure-welded to the end face TS of the longer side region LS1 of the welded coil piece CC1 on the side of the previous unit coil piece C02, for example. Then, burrs 55 generated in the new welded portion CP are removed (FIG. 6H).

Furthermore, the bending processing is performed for another new coil piece C (a unit coil piece C04 to be newly joined) (FIG. 6I), and the unit coil piece C04 and the welded coil piece CC2 are pressure-welded (FIG. 6J). In this example, the end face TS of the longer side region LS2 of the unit coil piece C04 is pressure-welded to the end face TS of the longer side region LS2 of the welded coil piece CC2 on the side of the previous unit coil piece C03, for example. Then, burrs 55 are removed to obtain a welded coil piece CC3 (FIG. 6K).

Thereafter, the steps of bending a new coil piece C (unit coil piece C0N to be newly joined), pressure-welding the unit coil piece C0N and a welded coil piece CCN-1, and removing burrs 55 to form a welded coil piece CCN, are repeated to obtain the helical structure body 50 with a prescribed number of turns.

The configuration of the bent portion B0 (formation position, angle α of the bent portion B0, etc.) is appropriately selected in accordance with the shape of the coil piece C, the configuration of the pressure-welding device, the amount of pressure welding (pressing amount) of the coil piece C, etc.

Figure 7A:
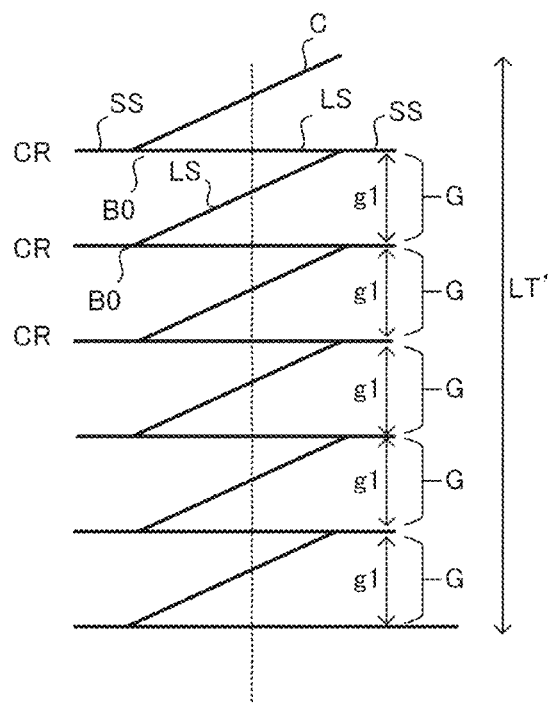
FIGS. 7A-7D include schematic side views of a helical structure body for illustrating the method for manufacturing a coil according to the present embodiment.
Figure 7B:
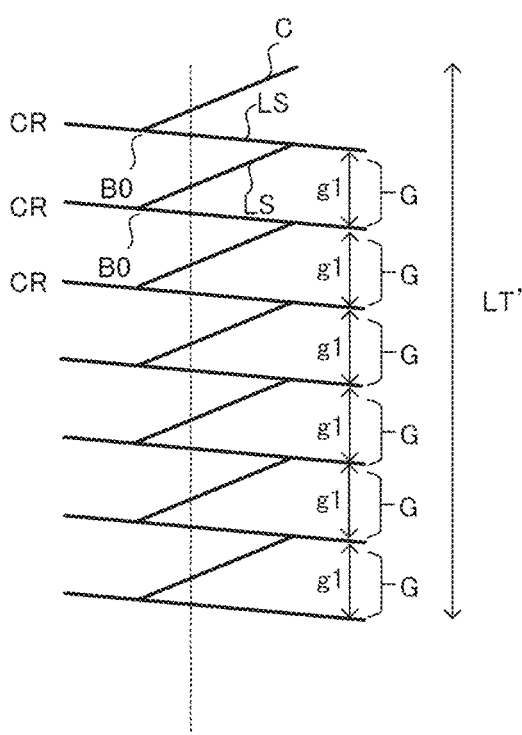
Figure 7C:
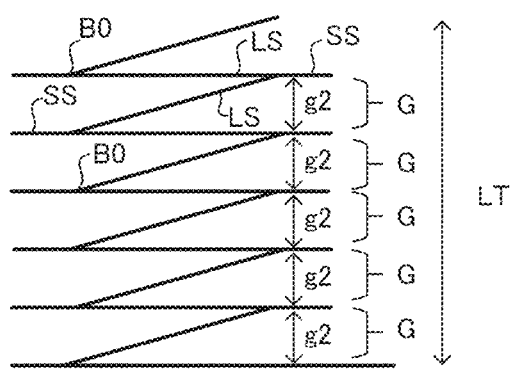
Figure 7D:
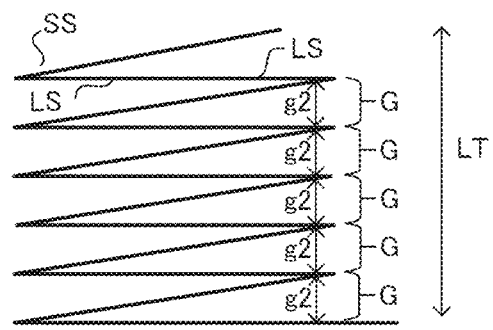

The intermediate molding step shown in step S3 in FIG. 3 will be described below. FIGS. 7A-7D include schematic side views showing the helical structure body 50 formed by pressure welding the coil pieces C corresponding to a prescribed number of turns. FIGS. 7A and 7B show the helical structure body 50 immediately after completion of all the pressure welding steps. FIGS. 7C and 7D show the helical structure body 50 after the intermediate molding.

The helical structure body 50 immediately after the end of the pressure welding steps has a shape as shown in FIG. 7A, that is, for example, the shape in which one longer side LS, out of the opposing longer sides LS, is substantially perpendicular to a helical axis (indicated by a dashed line). Without being limited to the shape shown in FIG. 7A, the shape of the helical structure body 50 may have a shape in which both the opposing longer sides LS are inclined with respect to the helical axis as shown in FIG. 7B.

As shown in FIGS. 7A and 7B, each coil piece C has a bent portion B0 to avoid interference with the pressure welding device. Immediately after the end of the pressure welding step, there is a large gap G (of approximately a distance g1) between the regions CR for one turn. The distance g1 of each gap G is not exactly equal to one another. The distance g1 is altered as it is extended or shortened due to distortion at the time of machining or due to the own weight of the helical structure body 50.

In the intermediate molding step, in order to reduce the distance g1 of the gap G, the helical structure body 50 is deformed (elastically deformed and/or plastically deformed) in the helical axis direction to be compressed as a whole. The intermediate molding step reduces the gap G between each of the regions CR for one turn and the next to approximately a distance g2 (<g1) (FIGS. 7C and 7D). In the intermediate molding step, the distance g1 may be shortened to the distance g2 with the bent portion B0 remaining as shown in FIG. 7C, or the distance g1 may be shortened to the distance g2 while the helical structure body 50 is deformed so that the bent portion B0 returns to a (substantially) flat surface (the bent portion is eliminated) as shown in FIG. 7D. Moreover, since a final molding step is performed later, the distance g2 may not be exactly equal. The distance g2 is a distance that appropriately separates the respective regions CR for one turn without causing close contact therebetween. The distance that appropriately separates is a distance that can sufficiently insulate each region CR for one turn in the later insulation step.

The intermediate molding shortens the overall length of the helical structure body 50 (a length LT' in the helical axis direction) to the length LT. In short, the intermediate molding step performs molding that reduces the overall length of the helical structure body 50 while maintaining the gap G of the distance g2.

The annealing step shown in step S5 in FIG. 3 will be described below. The helical structure body 50, which is made of a metal material (for example, a copper plate), experiences internal distortion and residual stress due to work hardening in the bending step, the pressure welding step, or the like, of the coil pieces C. Accordingly, annealing is performed to remove these distortions and residual stresses and soften the structure in order to improve workability. As an example, the plurality of helical structure bodies 50 is input into a heat treatment furnace (continuous annealing furnace) and heated to appropriate temperatures (e.g., a recrystallization temperature or higher) in an oxygen-free atmosphere (with an inert gas introduced, as necessary). The helical structure bodies 50 are held for a prescribed time, and are slowly cooled in the furnace. With the annealing, the metal material constituting the helical structure bodies 50 is altered into a structure without internal stress, and softens. The annealing also makes the helical structure bodies 50 susceptible to plastic deformation. It can also be said that annealing is performed to control the plasticity coefficient of the helical structure bodies 50 (to lower the elastic limit of the helical structure bodies 50). Although (the metal materials of) the helical structure bodies 50 soften after annealing, the shape is maintained unless external force is applied to the helical structure bodies 50.

As described before, in the pressure welding step, while the gap G of the regions CR for one turn of the helical structure body 50 is sufficiently maintained (at distance g1) in order to perform the press-contacting well, in the intermediate molding step reduces the gap G to the distance g2 and reduces the overall length of the helical structure body 50 (length LT). This can reduce the occupancy area of the respective helical structure bodies 50 in the furnace during the annealing step, and increase the number of helical structure bodies 50 that can be accommodated in the furnace.

Figure 8:
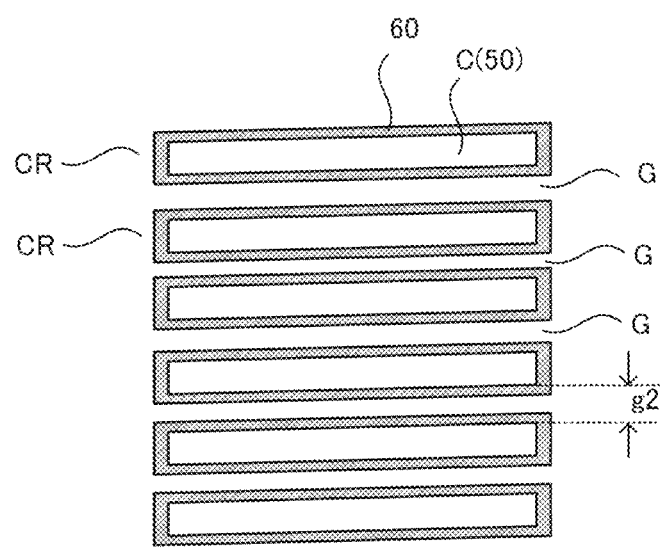
FIG. 8 is a schematic cross-sectional view of the helical structure body for illustrating the method for manufacturing a coil according to the present embodiment.

The insulation step in S7 shown in FIG. 3 will be described below. In the insulation step, the plurality of regions CR for one turn, which are overlapped in the helical structure body 50, are insulated from each other. FIG. 8 is a cross-sectional view taken along line X-X in FIG. 1A to show the outline of the helical structure body 50 after the end of the insulation step.

As an example, the insulation step is performed by coating each of the regions CR for one turn with an insulating resin 60. Specifically, the helical structure body 50 is immersed in a solution containing, for example, an insulating resin so that the helical structure body 50 is coated with the insulating resin 60 by electrodeposition, for example. The helical structure body 50 is formed with the gaps G (of distance g2). Accordingly, the insulating resin 60 also enters the gap G between each of the regions CR for one turn and the next, and the periphery of the flat conductors, formed by continuously joining the coil pieces C from one end side to the other end side along the helical traveling direction, is continuously covered with the insulating resin 60. Hence, as shown in FIG. 8, the plurality of the regions CR for one turn overlapped in the helical structure body 50 are insulated from each other.

In short, in the intermediate molding step in step S3, the distance g1 of the gap G is shortened to the distance g2. In the insulation step, the distance g2 of the gap G is maintained so that the periphery of the respective regions CR for one turn is reliably insulated, and all the regions CR for one turn (helical structure body 50) corresponding to the number of turns are continuously insulated.

In addition, the helical structure body 50 may be coated with the insulating resin 60 not only by immersion but also by spraying it with a liquid insulating resin 60.

After the annealing step (in the softened state), the helical structure body 50 may be deformed into the shape necessary for the coating of the insulating resin 60 (e.g., extension/reduction of the distance g2 of the gap G, etc.).

In the conventional art, a long round conducting wire (or a flat conductor) corresponding to the length of a completed coil is coated with an insulating resin, and then the round conducting wire is wound to form a helical structure. However, in that case, the insulating resin is stretched to reduce the coating thickness in the vicinity of the outer periphery of a wound curved portion, which results in deterioration of withstand voltage. In contrast, in the present embodiment, after the helical structure body 50 is formed, the insulation process is performed for the entire helical structure body 50 with the gap G present between each of the regions CR for one turn and the next. Therefore, it is possible to perform continuous and substantially uniform coating of the periphery of the flat conductors C, which constitute the helical structure body 50, with the insulating resin 60 from one end ST side to the other end ET side of the helical structure along the helical traveling direction. As a result, the uniformity of the film thickness of the insulating resin 60 can be enhanced.

Figure 9A:
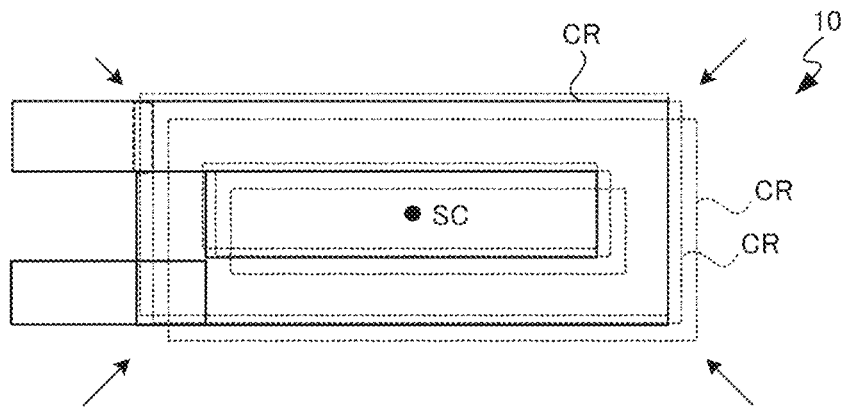
Figure 9B:
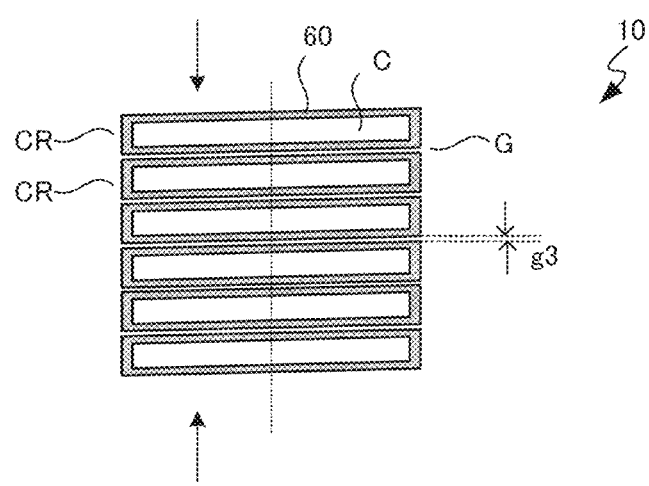
Figure 9C:
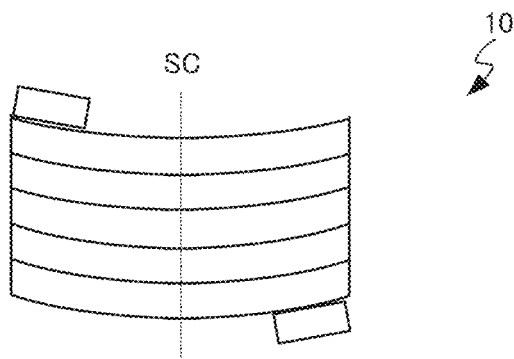

The molding step in step S9 shown in FIG. 3 will be described below. FIG. 9A is a plan view showing the appearance of the helical structure body 50 immediately after the insulation step (a plan view corresponding to FIG. 1A). FIG. 9B is a cross-sectional view corresponding to FIG. 8 (a cross-sectional view taken along line X-X of FIG. 1A). FIG. 9C is a side view corresponding to FIG. 1B.

The molding step is a step (final molding step) of molding the helical structure body 50 into a desired shape as a completed coil 10. In the manufacturing process described above, the respective regions CR for one turn may have their winding centers offset from the axial center SC of helix of the helical structure body 50 as indicated by dashed lines in FIG. 9A. In the molding step, alignment adjustment is performed by deforming (elastically deforming and/or plastically deforming) the respective regions CR for one turn as indicated by arrows, so that the centers of the winding of the respective regions CR for one turn coincide with the axial center SC of helix of the helical structure body 50.

Moreover, the respective regions CR for one turn are deformed (elastically deformed and/or plastically deformed) in the helical axis direction to flatten the bent portions B0 (flatten to eliminate the bent portions) (see FIG. 7D). In the case where the bent portions B0 are flattened in the intermediate molding step, flattening of the bent portions B0 in the molding step may be omitted, or the bent portions B0 may be overlapped and flattened into a final shape.

As shown in FIG. 9B, the gap G between each of the regions CR for one turn and the next is altered into a distance g3 which is desired for the coil 10. In the example shown in FIG. 9B, the gaps G between the regions CR for one turn are substantially 0 (g3≈0) (the respective regions CR for one turn are in close contact with one another). However, in the final molding, it is possible to mold the helical structure body 50 so that the gap G of the prescribed distance g3 (>0) is created between each of the regions CR for one turn and the next.

Furthermore, in the case of the coil 10 to be attached to the stator core, for example, the entire shape of the helical structure body 50 may be molded to match the shape of the stator core as necessary. For example, as shown in FIG. 9C, the helical structure body 50 may be molded into a curved shape in which an inner peripheral end portion and an outer peripheral end portion of the helical structure body 50 are not on the same plane, so that the helical structure body 50 has a protruding or recessed shape in the axial center SC direction of the helical structure body 50 (radial direction of the stator core). Thus, the coil 10 of the present invention (see FIGS. 1A-1C) is manufactured.

Modified examples of the present embodiment will be described below. FIGS. 10A-10D include flowcharts illustrating process flows of the method for manufacturing a coil according to modified examples of the present embodiment. FIGS. 11A-11E include schematic views of the coil 10 according to the modified examples of the present embodiment.

Figure 10A:
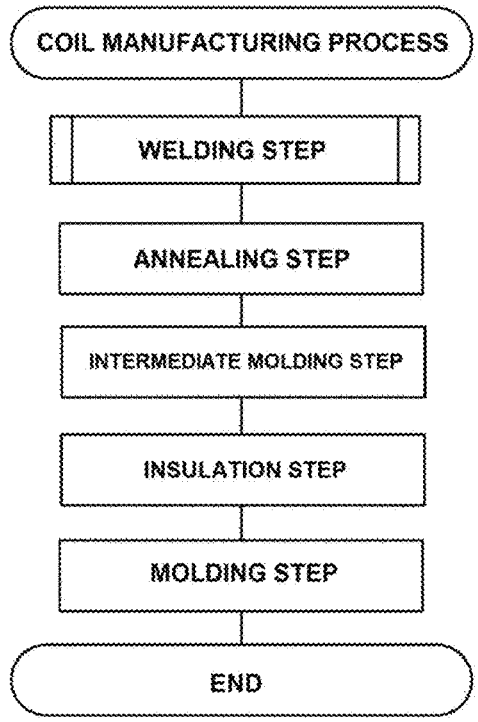
FIGS. 10A-10D include flowcharts for illustrating modified examples of the method for manufacturing a coil according to the present embodiment.

First, the intermediate molding step shown in step S3 in FIG. 3 may be performed after the annealing step (step S5). In other words, the method for manufacturing a coil may be performed in order of the welding step, the annealing step, the intermediate molding step, the insulation step, and the molding step as shown in FIG. 10A. For example, depending on the coil 10, and the number of turns and the size thereof, the configuration of the bent portion B0, etc., there are cases where there is no need to compress the helical structure body 50 before the annealing step (for the purpose of making effective use of the space in the furnace). In these cases, the intermediate molding step may be performed after the annealing step. In the intermediate molding step in that case, the helical structure body 50 is molded (deformed) into the shape suitable for the insulation step.

Figure 10B:
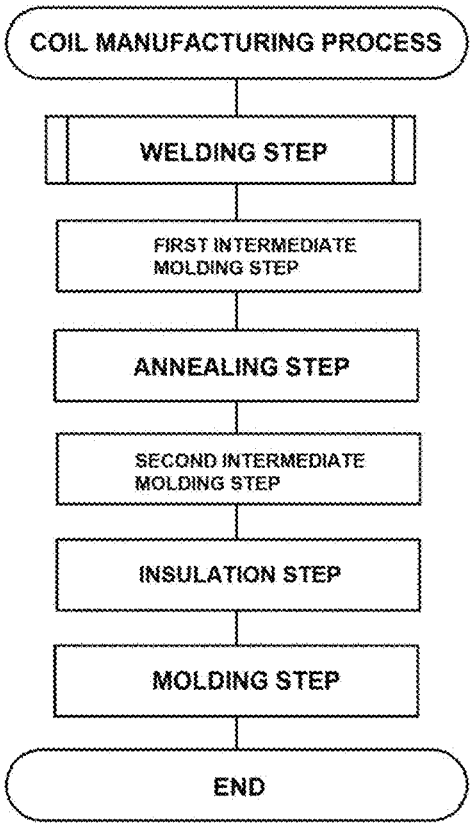

The intermediate molding step may also be performed before and after the annealing step. Specifically, the method for manufacturing a coil may be performed in order of the welding step, a first intermediate molding step, the annealing step, a second intermediate molding step, the insulation step, and the molding step as shown in FIG. 10B. In this case, in the first intermediate molding step, the helical structure body 50 is deformed (for example, the helical structure body 50 is compressed) into the shape suitable for the annealing step, and after the annealing step, the helical structure body 50 is molded (deformed) to the shape suitable for the insulation step.

Figure 10C:
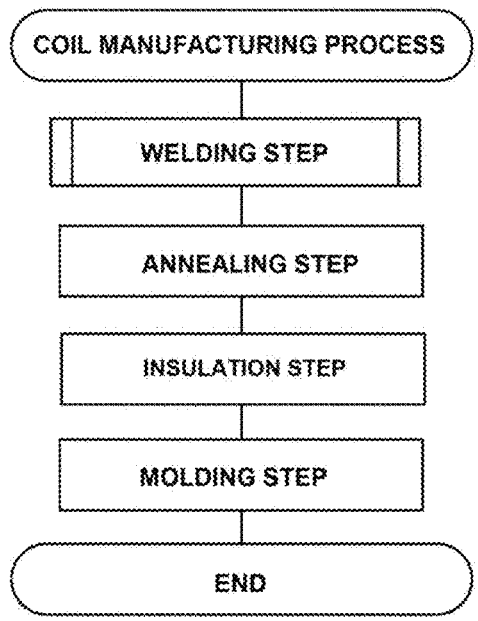

Moreover, the intermediate molding step may be omitted. Specifically, the method for manufacturing a coil may be performed in order of the welding step, the annealing step, the insulation step, and the molding step as shown in FIG. 10C. For example, depending on the coil 10, and the number of turns and the size thereof, the configuration of the bent portion B0, etc., there are cases where there is no need to compress the helical structure body 50 before the annealing step (for the purpose of making effective use of the space in the furnace). Since the helical structure body 50 is softened in the annealing step, and is finally molded (deformed) into a desired shape as the coil 10 in the molding step, the intermediate molding step may be omitted.

Figure 10D:
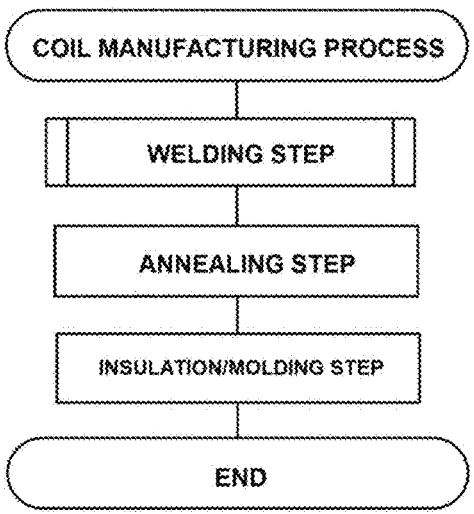

The insulation step may be performed concurrently with the molding step or after the molding step. In other words, the method for manufacturing a coil may be performed in order of the welding step, the annealing step, and an insulation/molding step (an insulation step and a molding step are in any order) as shown in FIG. 10D. Depending on methods for application and formation of an insulating resin, the insulation step may preferably be performed concurrently with the molding step or after the molding step.

The insulation step is not limited to coating with an insulating resin as long as the insulation process is performed to insulate the regions CR for one turn from each other. For example, the regions CR for one turn may be insulated by forming an insulating resin layer around each of the regions CR for one turn by a resin processing method such as injection molding. In this case, since the shape of the helical structure body 50 is fixed by the injection molding, the insulation step is performed after the molding step or concurrently with the molding step.

Figure 11A:
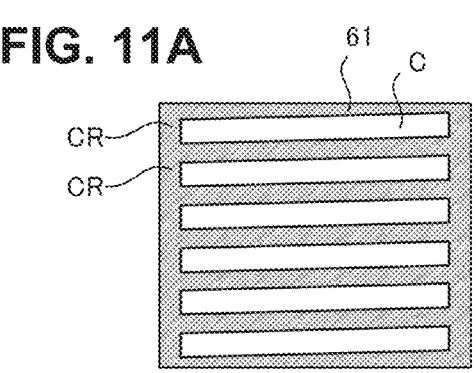
Figure 11B:
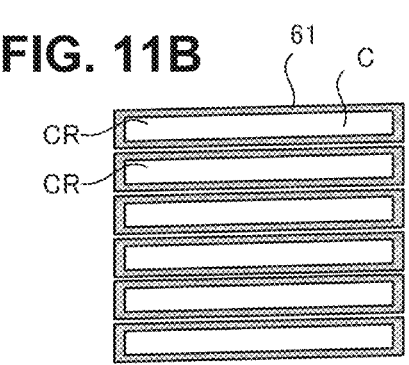

FIGS. 11A and 11B are cross-sectional views corresponding to FIG. 9B to show the outline of the coil 10 having an insulating resin layer 61 formed by injection molding. For example, in the molding step, the helical structure body 50 is molded into a desired final shape as the coil 10. Then, the insulating resin layer 61 is formed around each of the regions CR for one turn by injection molding. Alternatively, in the molding step, the helical structure body 50 is molded into a desired final shape as the coil 10, while at the same time, the insulating resin layer 61 is formed around each of the regions CR for one turn by injection molding.

FIG. 11A shows an example of the case where a mold is used to insulate the regions CR for one turn from each other while integrally coating the helical structure body 50 with the insulating resin layer 61 (applying the insulating resin layer 61 to the helical structure body 50). FIG. 11B is an example of the case where a mold is used to coat each of the regions CR for one turn with the insulating resin layer 61 (to apply the insulating resin layer 61 to each of the regions CR for one turn).

Figure 11C:
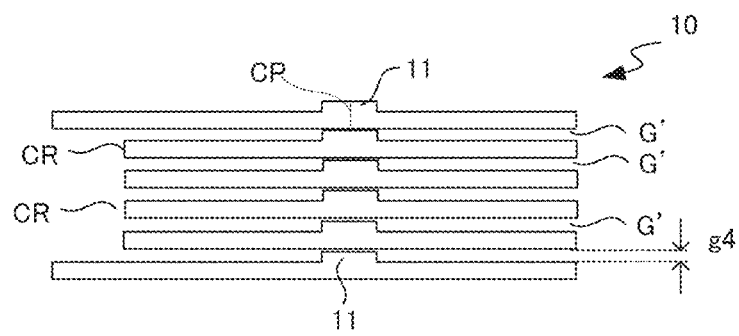

FIG. 11C is a side view of the coil 10 according to another modified example corresponding to FIG. 1C. As shown in FIG. 11C, the coil 10 in a completed state may be configured such that a gap G' of a prescribed distance g4 is maintained between each of the regions CR for one turn and the next. In this case, the gap G' is secured as a completed shape. For example, when the coil 10 is attached to a stator, the distance g4 is maintained (secured) without deformation. Specifically, the prescribed distance g4 is secured for each of the gaps G' by providing a spacer 11, for example.

When the gap "G'" is maintained between each of the regions CR for one turn of the completed coil 10 and the next, it is possible to cool the inside (between the regions CR for one turn) of the coil 10, so that the heat dissipation performance can be enhanced and thereby the properties of the coil 10 can be enhanced.

In other words, the distance g4 is the distance that allows a fluid (for example, air and liquid such as a refrigerant) to pass through. For example, the distance g4 is shorter than any one of the distances g1 to g3. However, the distance g4 may be equal to or different from any one of the distances g1 to g3.

The spacer 11 is formed, for example, by using part of the coil pieces C during manufacturing process of the coil 10. Specifically, in the deburring step (step S14) in the welding step shown in FIG. 5, for example, part of the burrs 55 to be removed is left so as to form a protruding shape on the welded portion CP and is used as the spacer 11.

Figure 11D:
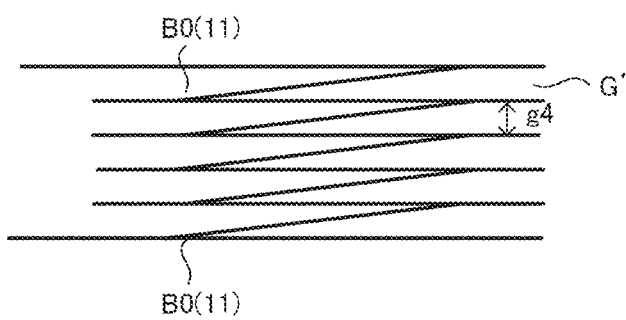

As shown in FIG. 11D, in the intermediate molding step or the molding step, the bent portion B0 may be left without being completely flattened and be used as the spacer 11 for securing the gap G' of the prescribed distance g4. In the molding step, the bent portion B0 may be flattened but the gap G' may be maintained (without providing a physical spacer 11).

Figure 11E:
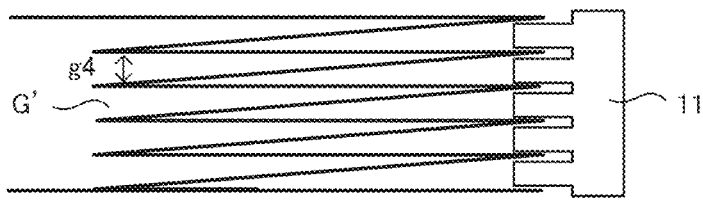

Alternatively, the spacer 11 may a component (separate from the coil 10) other than the coil 10. For example, the spacer 11 is prepared as a separate component as shown in FIG. 11E. During the molding step (step S9 in FIG. 3), the spacer 11 is inserted between each of the regions CR for one turn and the next, and molded.

Alternatively, when injection molding is performed in the insulation step (for example, step S7 in FIG. 3), a mold that can secure the gaps G' of the distance g4 may be used. In this case, a mold that can apply the insulating resin layer 61 to each of the regions CR for one turn may be used (see FIG. 11B).

According to the present embodiment, coil pieces C having a substantially right-angled corner portion TN are formed by punching or the like, and the coil pieces C are then continuously joined and pressure-welded to form a coil 10. In short, the substantially right-angled corner portions TN of the coil pieces C constitute corner portions of the coil 10. Therefore, the present embodiment makes it possible to manufacture the coil 10 in which corner portions on the inner peripheral side and the outer peripheral side of the regions CR for one turn are formed into a substantially right-angled shape. In the past, a long flat conductor has been wound to manufacture a coil made of a flat conductor. In the coil formed by winding, it is inevitable that at least the corner portion on the inner peripheral side of the coil is formed into a curved shape, which hinders enhancement in space factor, enhancement in heat dissipation performance, and the like, in the case of being attached to a stator.

However, according to the present embodiment, the space factor in the case where the coil is attached to the stator can be enhanced, and also the heat dissipation performance can be enhanced by elimination of excessive space.

Particularly, the welded portion CP between the coil pieces C is provided in a linear portion other than the corner portion TN (corner portion). In short, pressure welding is performed by using the linear portion of the coil pieces. As a result, the precision of the shape of the corner portion TN can be enhanced. For example, the original shape of a corner portion, which is formed to be in a right-angled (substantially right-angled) shape through punching process, can be maintained as it is.

In the pressure welding step, a large load is applied to pressure welding between the end faces TS of the coil pieces C. However, through the annealing step and the subsequent molding step, the coil 10 free from unnecessary strain and residual stress can be provided.

In addition, after the helical structure body 50 with a required number of turns is formed as the coil 10 as a finished product, the insulation step is performed (insulation process is performed) while a necessary and sufficient gap G between each of the regions CR for one turn and the next is maintained. This makes it possible to reliably and evenly insulate each of the regions CR for one turn even in the corner portions (to form a coating of insulating resin or to apply an insulating resin layer), and to thereby achieve high voltage resistance.

As described above, the present invention is not limited to the above-described embodiments, and may be configured in various embodiments.

For example, in the above-described embodiment, the cases where the coil pieces C are U-shaped have been described as examples. However, the coil pieces C may be in other shapes as shown in FIGS. 2A-2G.

In the above-described embodiment, the configuration has been described in which the coil pieces C are deformed one by one at a time (the bent portion B0 is formed) in the bending step before welding, and then the coil pieces C are pressure-welded in the pressure welding step. However, without being limited thereto, the present invention may be configured such that in the bending step, all the coil pieces C corresponding to a necessary number of turns are all deformed (to form the bent portions B0) in advance, and then the deformed coil pieces C are used to perform pressure welding in the pressure welding step.

In the present embodiment, examples have been described in which whenever in the pressure welding step, one welded portion CP is formed, the burrs 55 are removed from the welded portion CP in the deburring step, and the welded portion CP is pressure-welded to a next coil piece C. However, the present invention is not limited to the examples. In the helical structure body 50 scheduled to be completed, a plurality of (or all) welded portions CP are formed, and then a plurality of burrs 55 generated in the respective welded portions CP may be removed. In this case, after an Nth pressure welding step, a plurality of (N) burrs 55 may collectively be removed (as a unit) in one deburring step, or after the Nth pressure welding step, the deburring step may be performed a plurality of number of times (e.g., two to N times or more) to remove the plurality of (N) burrs 55.

One coil piece C is not limited to one configured by a punching process of a copper plate. The coil piece may also be formed by parallel arrangement of a plurality of thin flat conductors (for example, flat conductors having a square-shaped cross section (cross section corresponding to FIGS. 2B and 2C) orthogonal to the strip longitudinal direction BL) in a strip transverse direction BS of the helical structure body 50 (in a direction orthogonal to the helical traveling direction).

In addition, the coil pieces C are not limited to those configured by the punching processing. The coil pieces C may be round wires (round conductors) deformed into flat conductors by pressing, for example.

The plurality of coil pieces C may have widths which are different in strip transverse direction BS from each other (which are gradually larger (or smaller)) along the helical traveling direction. In this case, the coil pieces C may have thicknesses (thicknesses in the axial direction of helix) which are different according to the widths of the coil pieces C in the strip transverse direction BS so that the cross-sectional areas, orthogonal to the helical traveling direction, at any positions in the helical traveling direction (for example, cross-sectional areas corresponding to FIG. 2B) are equal to each other. The coil 10 formed in this manner has an outline shape of a truncated four-sided pyramid, as shown in FIG. 1B.

Furthermore, two coil pieces C to be pressure-welded to each other may be different in the shape of their end faces TS. For example, the coil pieces C may be configured to be different in width (length in the strip transverse direction BS) as the shape of their end faces TS, the coil pieces C may be configured to be different in thickness (length between the wider surfaces WS), or the coil pieces C may be configured to be different in width and thickness.

The plurality of coil pieces C may also be constituted of flat conductors and round wires. In other words, a coil piece C constituted of a flat conductor and a coil piece C constituted of a round wire may be configured to be pressure-welded to each other.

In addition, some or all of the corner portions TN of the coil pieces C may be substantially right-angled on the inner peripheral side and may have a curved part on the outer peripheral side. Some or all of the corner portions TN of the coil pieces C may also have a curved part on at least part of the inner peripheral side.

The present invention can be applied to a case where coils (flat rectangular coil, edgewise coil) are manufactured using flat conductors.

REFERENCE SIGNS LIST 10 coil
11 spacer
50 helical structure
50' virtual helical structure body
55 burr
60 insulating resin
61 insulating resin layer
B0 bent portion
BL strip longitudinal direction
BS strip transverse direction
C flat conductor (coil piece)
C0 unit coil piece
CC welded coil piece
CP welded portion
CR region for one turn
CR' virtual region for one turn
G gap
LS longer side
LS1, LS2 longer side region
SS shorter side
SC axial center
STR straight portion
T number of turns
T1 end portion
T2 end portion
TN corner portion
TS, TS0, TS1, TS2 end face

The invention claimed is:

1. A method for manufacturing a coil comprising steps of:
preparing a plurality of strip-shaped flat conductors;
welding a helical structure body having a plurality of regions for one turn by butting and pressing one end face of one of the flat conductors with one end face of another one of the flat conductors in a strip longitudinal direction;
annealing the helical structure body;
insulating each of the regions for one turn of the helical structure body by forming an insulating resin layer around each of the regions for one turn by injection molding.

2. The method for manufacturing the coil of claim 1, further comprising a deburring by removing a burr generated by welding the helical structure body.

3. The method for manufacturing the coil of claim 1, further comprising molding the helical structure body into a coil shape.

4. The method for manufacturing the coil of claim 1, further comprising:
bending one or more of the flat conductors so that one portion along a helical traveling direction is inclined with respect to another portion.

5. The method for manufacturing the coil of claim 4, wherein:
each of the plurality of flat conductors form a virtual helical structure body by abutting end faces thereof against one another, the virtual helical structure body being set so that a length of a virtual region for one turn in the helical travelling direction is longer, by a pressing amount for welding, than a length of the region for one turn; and in the welding step, the flat conductor and another one are pressed against each other so that the length of the virtual region for one turn is identical to the length of the region for one turn of the helical structure body.

6. The method for manufacturing the coil of claim 4, wherein the plurality of the regions for one turn are overlapped in the helical structure body and are insulated from each other.

\* \* \* \* \*